Patented Feb. 4, 1930

1,745,734

UNITED STATES PATENT OFFICE

HANS BRENEK, OF AACHEN, GERMANY, ASSIGNOR TO THE FIRM RHENANIA VEREIN CHEMISCHER FABRIKEN AKTIENGESELLSCHAFT, OF AACHEN, GERMANY, A CORPORATION OF GERMANY

METHOD FOR MAKING SOLUTIONS OF SALTS OF ALKALI METAL AND ALUMINUM

No Drawing. Application filed July 3, 1924, Serial No. 724,162, and in Germany July 10, 1923.

It is an established fact that many alkaliferous minerals or rocks contain only a part of the alkali in a form soluble in acid.

By treating such minerals with acid a comparatively small portion of the alkali present is dissolved as a rule. This treatment moreover has the disadvantage that at the same time a part of the silica goes into solution in a colloidal state which seriously interferes with the subsequent working-up of the solutions.

Now I have found that many alkaliferous rocks of this kind, for instance new volcanic minerals such as phonolites, leucites, leucitphrites as well as old volcanic rocks such as feldspar become completely soluble in acid by heating them to temperatures which permit the compounds crystallized out in the natural rock to flow into a homogenous mass. This is achieved not only by complete fusion, but also either by thorough sintering or by heating up to temperatures at which the melting begins. In the execution of my invention I heat for example the alkaliferous minerals to be worked to a temperature at which it sinters or fuses and subsequently treat the product thus heated with acid preferably after previous disintegration. For the purpose of dissolving the product resulting from the sintering or melting process the melt is treated advantageously with water in a suitable manner, for example by allowing it to run into water or by spraying water on to it. In this way the melt is converted by the simplest means into a glassy powder similar to the well known slag sand obtained from blast furnace slag. This sand is then dissolved by treating it with acid.

A particularly advantageous method of carrying my invention into practice consists in quenching the hot fusion or sintering product immediately with acid instead of with water. As a result the alkaliferous rock is dissolved in the acid whilst the silica is separated in a crystalline form, this process simplifying and facilitating considerably the working-up of the solutions.

When working in accordance with this invention the total alkali present in the mineral goes into solution. At the same time this offers the additional advantage that the insoluble alumina present in the respective original rock is made soluble and is obtained in a dissolved form when treated with acid. When for example a mineral such as phonolite containing in addition to considerable quantities of alkali also alumina, is treated according to my invention utilizing for instance sulfuric acid as the solvent, a solution is obtained containing potassium sulfate and also alumina. Such a solution can be worked up in the simplest way, for example into potassium aluminate. As a matter of course each of the valuable substances contained in the solutions thus produced may be prepared separately.

What I claim is:

1. Method for making aqueous solutions of salts of an alkali-metal and aluminum from rocks containing silica and insoluble compounds of alkali-metal and aluminum which comprises heating said rocks to the fusing point, treating said hot rocks with an aqueous solution of an acid, quenching the melt in acid and separating by filtration the salt solution obtained from the insoluble residue.

2. Method for making aqueous solutions of sulfates of an alkali-metal and aluminum from rocks containing silica and insoluble compounds of alkali-metal and aluminum which comprises heating said rocks to the fusing point, treating said hot rocks with an aqueous solution of sulphuric acid, quenching the melt in acid and separating by filtration the salt solution obtained from the insoluble residue.

In testimony whereof I affix my signature.

HANS BRENEK.